(12) United States Patent
Mazzarelli et al.

(10) Patent No.: US 8,066,318 B2
(45) Date of Patent: Nov. 29, 2011

(54) COVER FOR CARGO IN TRANSIT AND DEVICE FOR SECURING A COVER TO CARGO

(75) Inventors: Samuel Mazzarelli, Goshen, CT (US); David Mazzarelli, Torrington, CT (US)

(73) Assignee: Commercial Sewing, Inc., Torrington, CT (US)

( * ) Notice: Subject to any disclaimer, the term of this patent is extended or adjusted under 35 U.S.C. 154(b) by 0 days.

(21) Appl. No.: 11/223,093

(22) Filed: Sep. 9, 2005

(65) Prior Publication Data

US 2006/0049661 A1    Mar. 9, 2006

Related U.S. Application Data

(60) Provisional application No. 60/608,793, filed on Sep. 9, 2004.

(51) Int. Cl.
  *B60J 11/04*   (2006.01)
(52) U.S. Cl. .......... 296/136.01; 296/136.1; 296/136.07; 150/166; 114/361
(58) Field of Classification Search .......... 296/136.01, 296/136.1, 136.07; 150/166; 114/361
See application file for complete search history.

(56) References Cited

U.S. PATENT DOCUMENTS

| | | | |
|---|---|---|---|
| 2,536,152 A | 1/1951 | Bass | |
| 3,024,717 A * | 3/1962 | Rozek | 296/136.1 |
| 3,968,913 A | 7/1976 | Weed et al. | |
| 4,009,744 A | 3/1977 | Joslyn | |
| 4,261,401 A | 4/1981 | Hickey | |
| 4,598,725 A | 7/1986 | Brewer | |
| 4,629,104 A | 12/1986 | Jacquet | |
| 4,668,007 A | 5/1987 | Sloan | |
| 4,715,646 A | 12/1987 | Goffi et al. | |
| 4,763,783 A | 8/1988 | Talbot | |
| 4,898,085 A * | 2/1990 | Jarnot | 454/275 |
| 4,938,522 A | 7/1990 | Herron et al. | |
| 4,944,340 A | 7/1990 | Tortorich | |
| 4,976,389 A | 12/1990 | McLellan et al. | |
| 5,081,911 A * | 1/1992 | Talbot | 454/370 |
| 5,282,502 A | 2/1994 | Ballard | |
| 5,291,698 A | 3/1994 | Rayner, Jr. | |
| 5,291,848 A | 3/1994 | Wilhelm et al. | |
| 5,673,961 A * | 10/1997 | Mazzarelli | 296/136.07 |

(Continued)

FOREIGN PATENT DOCUMENTS

FR    2434076    8/1978

(Continued)

OTHER PUBLICATIONS

PCT Search Report—PCT US05/32066.

*Primary Examiner* — Jason S Morrow
(74) *Attorney, Agent, or Firm* — Cantor Colburn LLP

(57) ABSTRACT

A device for covering an object which is transported in an air stream, including a cover which at least partially traverses the object, and a differential pressure device disposed on the cover which creates a pressure differential between the air under the cover and the air passing over or around the cover, where the pressure differential causes the air under the cover to exhaust to an exterior of the cover, drawing the cover toward the object, and where the pressure differential device creates the pressure differential when the covered object is transported in a frontward position with respect to a direction of travel and in a rearward position with respect to the direction of transport.

8 Claims, 12 Drawing Sheets

U.S. PATENT DOCUMENTS

| | | | | |
|---|---|---|---|---|
| 5,997,071 A | * | 12/1999 | Mazzarelli | 296/136.07 |
| 6,918,626 B2 | * | 7/2005 | Morin et al. | 296/136.01 |
| 7,044,532 B2 | * | 5/2006 | Yang | 296/136.1 |
| 7,125,066 B2 | * | 10/2006 | McNamee | 296/136.07 |
| 2002/0069947 A1 | * | 6/2002 | Frechette et al. | 296/136 |

FOREIGN PATENT DOCUMENTS

FR      2543891      10/1984

\* cited by examiner

COVER FOR CARGO IN TRANSIT AND DEVICE FOR SECURING A COVER TO CARGO

CROSS-REFERENCE TO RELATED APPLICATIONS

This application claims the benefit of U.S. Provisional Patent Application No. 60/608,793 of the same title filed on Sep. 9, 2004, which is herein incorporated by reference. The application is also related to U.S. Pat. Nos. 5,673,961 and 5,997,071 granted Oct. 7, 1997 and Dec. 7, 1999, respectively, both of which applications are herein incorporated by reference in their entirety.

BACKGROUND OF THE INVENTION

The present invent generally relates to covers for protecting cargo being transported by motor vehicles and, more particularly, to a protective cover having features for securing the cover to the cargo by differential pressure.

Covers are widely employed during transit to protect valuable cargo, such as boats and other personal watercraft, snowmobiles, automobiles, bicycles, etc., from the elements of weather and from wind blown debris. However, at higher speeds, air flow has a tendency to blow the cover off the cargo. As a result, tie down devices such as straps and buckles have been employed to secure the cover over the cargo. However, even when tied down, such cover has a tendency to whip and buffet as a result of the air flow about the cover particularly when a high speed air stream flows under the cover. This whipping and buffeting can cause the cover to tear and even damage the cargo underneath it. Moreover, the whipping and buffeting of the cover generates considerable noise and can produce undesired drag with respect to forward movement.

Accordingly, a cover for protecting cargo in transit is desired which provides simple and effective securing of the cover to the cargo.

SUMMARY OF THE INVENTION

The invention provides a cover for an object in transport and a device for securing such cover to the object. More broadly, the invention provides a device for securing one object to another.

In one embodiment of the invention, a device for covering an object which is transported in an air stream is provided. The device includes a cover which at least partially traverses the object and a differential pressure device disposed on the cover. The differential pressure device creates a pressure differential between the air under the cover and the air passing over or around the cover. This pressure differential causes the air under the cover to exhaust to an exterior of the cover, drawing the cover toward the object. The pressure differential device creates the pressure differential when the covered object is transported in a frontward position with respect to a direction of travel and in a rearward position with respect to the direction of transport.

The invention additionally provides another embodiment of a device for covering an object which is transported in an air stream. Here, the device includes a cover, an exhaust aperture formed in the cover, a member disposed at least partially over the aperture including an opening oriented at an angle of approximately 180° with respect to a direction of transport, and a pathway extending from the aperture to the opening.

The invention further provides another exemplary embodiment of a device for covering an object which is transported in an air stream. This device includes a cover, at least one exhaust aperture formed in the cover, a member disposed at least partially over the aperture including a plurality of openings, and a plurality of pathways extending from the at least one aperture to the corresponding openings.

The invention also provides a device for securing a first object to a second object in a fluid stream. This device includes a member disposed on the first object proximate to an aperture formed in the first object, where the member creates a low pressure in the fluid stream proximate to the opening of the member independent of the direction of the fluid stream relative to the member. The low pressure area draws higher pressure fluid from between the first and second objects through the aperture to create a suction between the first and second objections which secures the first object to the second object.

BRIEF DESCRIPTION OF THE DRAWINGS

Referring now to the drawings wherein like elements are numbered alike in the several FIGURES.

DETAILED DESCRIPTION OF THE PREFERRED EMBODIMENT

Figure 1:
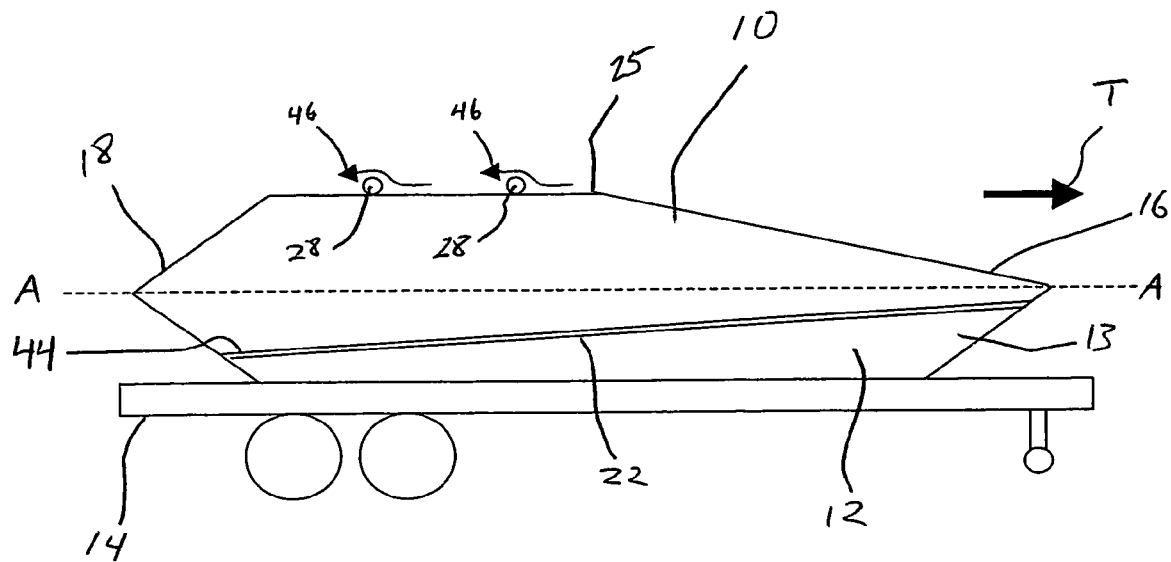
FIG. 1 is a side view of a cover embodying the present invent as secured about a watercraft on a trailer.
Figure 2:
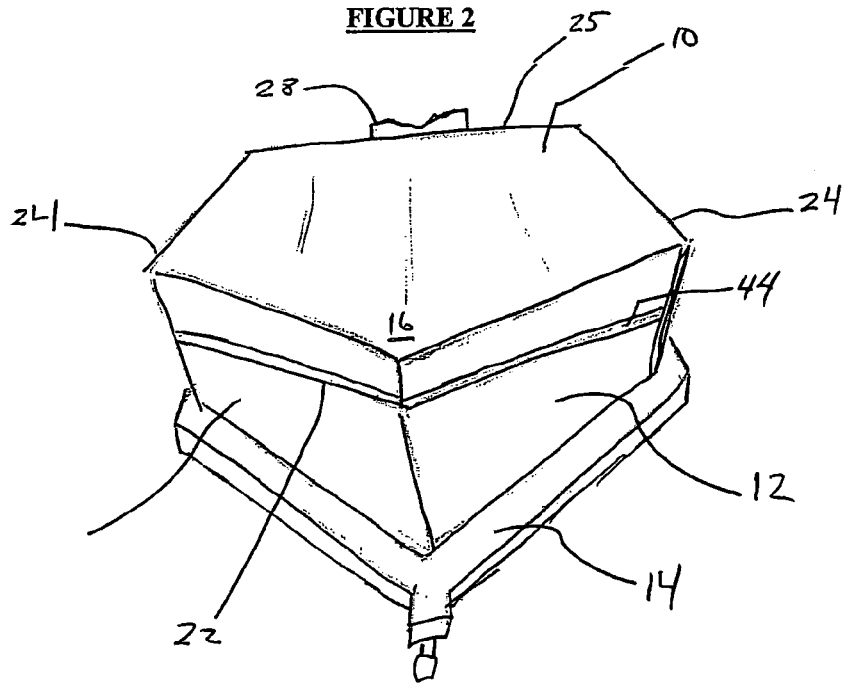
FIG. 2 is a front view thereof.
Figure 3:
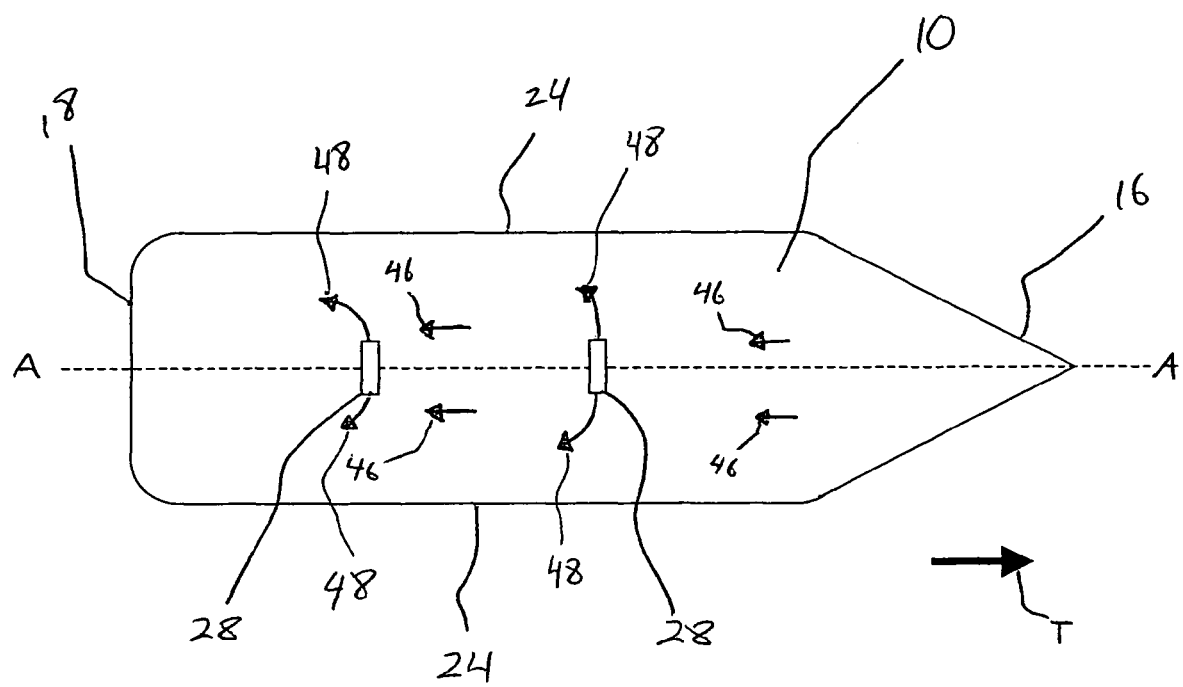
FIG. 3 is a top view thereof.

Turning first to FIGS. 1-3, therein illustrated is an exemplary protective cover embodying the present invention, generally designated by the numeral 10, covering a watercraft generally designated by the numeral 12. The watercraft 12 is transported on a trailer 14 in the direction of travel, indicated by the arrow T, by a vehicle (not shown).

The cover 10 is shown and described herein as applied to the watercraft 12 for exemplary purposes only. It shall be understood that the protective cover of the present invention may be applied to any cargo in transit including, but not limited to, boats and other personal watercraft, snowmobiles, automobiles, bicycles, motorcycles, and/or other items in tow by a motor vehicle, train, etc., or otherwise externally exposed during transit. This being understood, for purposes of simplicity and example, the cover is herein described with respect to the watercraft 12.

The cover 10 is preferably made of a flexible, air impermeable material which is dimensioned and configured to conform closely to exterior contours of the watercraft 12. The cover 10 has a bottom 22 which defines an opening large enough to fit over a hull 13 of the watercraft 12. The bottom 22 of the cover 10 is fitted to and secured about the periphery of the hull 13 of the watercraft 12 by a securing feature such as an elasticized band 44 about the bottom edge 22.

The cover 10 has a front end 16 which is disposed forwardly in relation to the direction of travel T. The cover 10 further includes sides 24, a top 25, and a rear end 18 disposed opposite the front end 16. As the watercraft 12 of FIG. 1 is transported on the trailer 14, air flows over and around the cover 10 opposite the direction of travel T from the front end 16 to the rear end 18.

Figure 4:
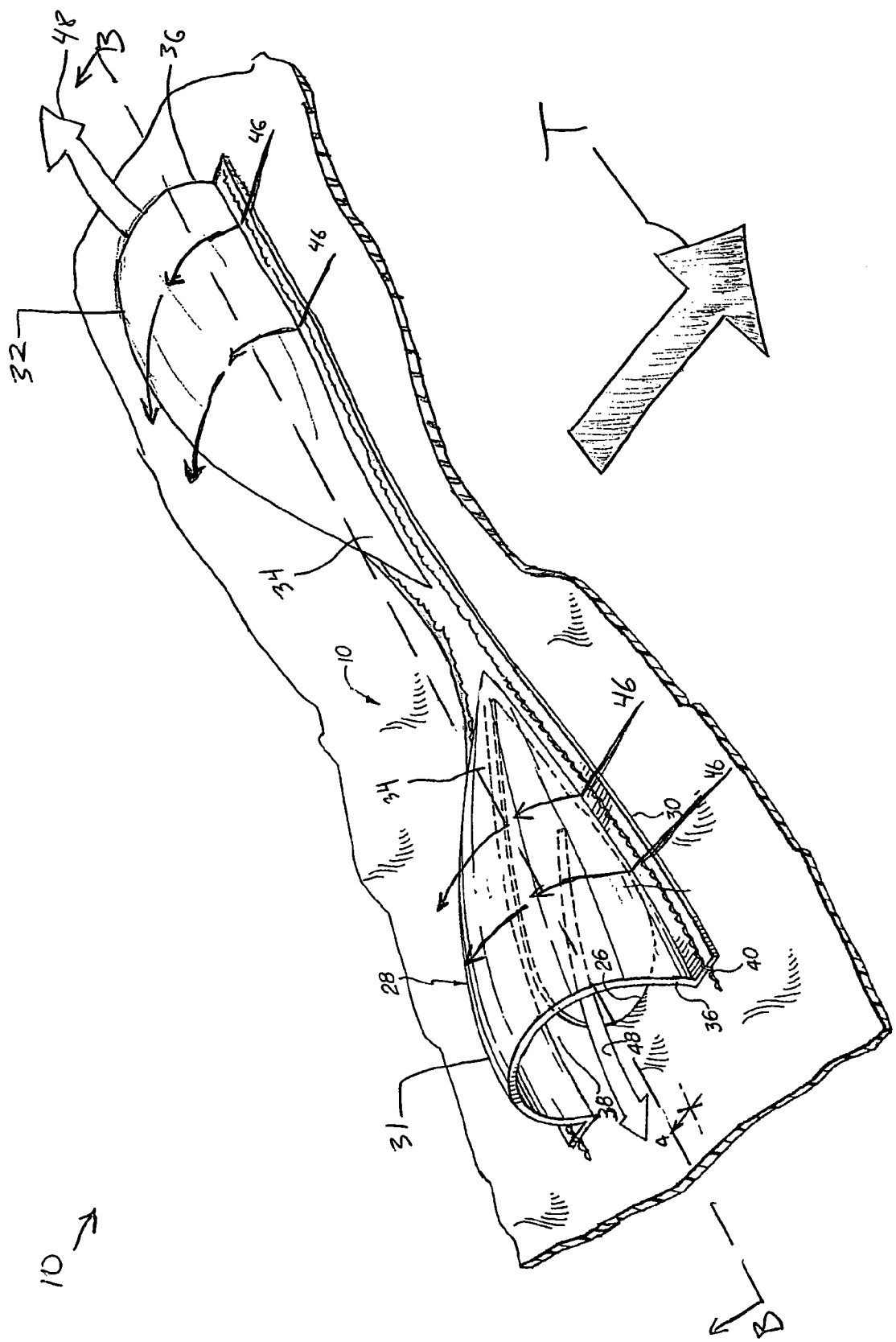
FIG. 4 is an enlarged partial view of the cover showing a device thereon and diagrammatic air flow thereabout.
Figure 5:
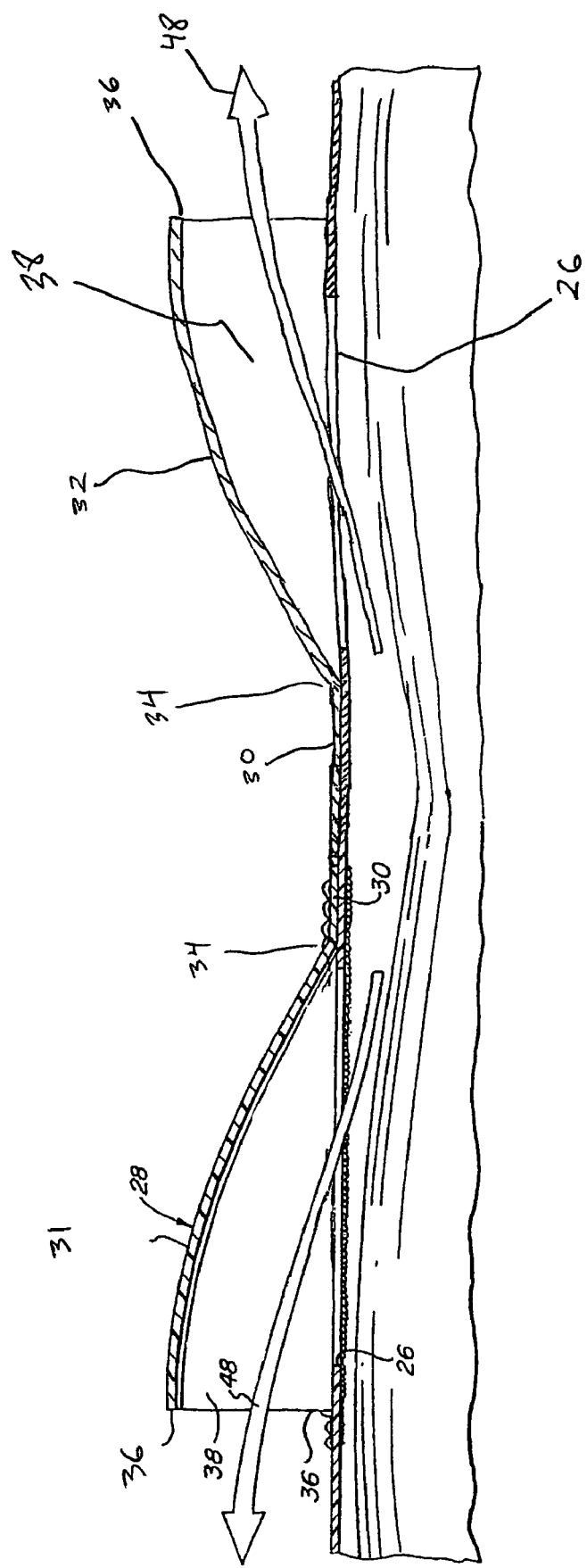
FIG. 5 is a sectional view of the device and cover taken along the line B-B of FIG. 4.

The cover 10 additionally includes at least one pressure differential device, generally designated by the numeral 28. As best seen in FIGS. 4 and 5, each device 28 is disposed over an exhaust aperture 26 formed in the cover 10. Turning back to FIGS. 1-3, the device 28 and exhaust aperture 26 are disposed on the top 25 of the cover 10. In a preferred embodiment, several devices 28, for example two devices 28 and two corresponding exhaust apertures 26, are disposed at the top 25 of the cover 10 and are aligned with a longitudinal axis A-A of the watercraft 12 as best seen in FIG. 3. The shape of the exhaust apertures 26 desirably conforms to the shape of the device 28 which is secured thereover. Preferably the apertures 26 are oval in shape or partly oval such as, for example, a tear-drop shape. However, the invention contemplates the apertures comprising any desired configuration such as, for example, rectangular, circular, or, more generally, any rectilinear or curvilinear shape or combination thereof.

Returning to FIGS. 4 and 5, a pressure differential device 28 is shown in an exemplary embodiment of the invention. The device 28 has a base portion 30 in the form of an outwardly extending flange and first and second body portions 31 and 32, respectively, each of generally arcuate cross section which extend oppositely from one another and outwardly from the base 30. The device 28 is fixed to the exterior of the cover 10 over two exhaust apertures 26. For example, the device 28 may be sewn by thread 40 to the cover 10, as shown in FIG. 4. Alternatively, of course, the device 28 may be fixed to the cover 10 by welding, adhesives, or any suitable fixation means. In this embodiment, the body portions 31, 32 of the device 28 each have an elongated, streamlined configuration which approximates an axial segment of a cone, thus giving the base portion 30 a generally X-like shape.

Of course, the body portions 31, 32 and the base portion 30, and the device in general, may have any of a variety of shapes suitable for enhancing a pressure differential, as discussed in more detail herein.

In the exemplary embodiment of the invention, as shown in FIGS. 4-5, the body portions 31, 32 have closed ends 34 disposed adjacent one another and open ends 36 disposed opposite the respective closed ends 34. Each of the first and second body portions 31,32 provide a passage 38 from the exhaust aperture 26 to the open end 36.

The device 28 and apertures 26 of the cover 10 result in the desired pressure differential, as discussed in more detail below, when the device 28 and apertures 26 are disposed generally at any low turbulent area on the cover 10 and generally in any orientation with respect to the direction of movement T of the watercraft trailer 14. For example, with reference to FIGS. 1-5, the device 28 and aperture 26 may be disposed on the top 25, sides 24, front end 16, rear end 18, etc. of the cover 10. Additionally, the device 28 and aperture 26 may be disposed on the cover 10 such that a longitudinal axis B-B of the device 28 is perpendicular to the direction of movement T or at any angle thereto. For example, the longitudinal axis B-B of the device 28 may be parallel to the direction of movement T, or at 30° with respect to the direction of movement T, or at 60° with respect to T, or at 90°, etc.

A preferred orientation of the device 28 and apertures 26 is with the longitudinal axis B-B perpendicular to the direction of movement T and a preferred disposition of the device 28 and apertures 26 on the cover 10 is on the top 25 thereof along the longitudinal axis A-A of the watercraft 12, as shown in FIGS. 1-3 and 15-18.

Where the longitudinal axis B-B of the device 28 is oriented as such (i.e., generally perpendicular to the direction of travel T), a smooth stream of air passes over the streamlined shape of the device 28, as illustrated by the arrows 46, and, due to Venturi effects, creates and/or enhances a drop in air pressure in the area of the open end 36. This pressure drop creates a pressure differential between the air in the area of the open end 36 and the air under the cover. The pressure differential induces the air to exhaust from under the cover 10 through the exhaust aperture 26 (as illustrated by the unshaded arrow 48 in FIGS. 4 and 5). The exhausting air causes, in essence, a suction which draws the cover 10 closely to the surface of the watercraft 12. The device 28 enhances the pressure differential between the air under the cover 10 and the air passing over the cover 10. The desired suction effect is accordingly maximized. Thus, without excessive use of straps, buckles, etc., the cover is adhered tightly onto the cargo and buffeting and whipping of the cover is significantly inhibited.

With conventional covers, forces which cause buffeting thereof increase with vehicle speed. In the cover 10 of the present invention, however, the pressure differential created by the device 28, and thus the resulting air exhaust 48, correspondingly increases with vehicle speed and counteracts the increasing buffeting forces to keep the cover 10 tightly conforming to the peripheral surface of the watercraft 12. That is, as the speed of the airflow 46 increases with the traveling speed, the pressure differential at the device 28 correspondingly increases, inducing more air to exhaust and causing the cover 10 to conform more tightly to the surface of the watercraft 12.

It is emphasized that the device 28 is effective at creating and enhancing the desired pressure differential, and hence the resulting suction of air from beneath the cover 10, when the device 28 is oriented in any direction and/or disposition with respect to the direction of travel T of the trailer 14. That is, the device 28 and the corresponding apertures 26 may be disposed such that the longitudinal axis B-B of the device 28 is at any angle to the direction of travel T, such as 90° to the direction of travel T, or 30°, 45°, 60°, 270°, etc.

The pressure differential device of the cover 10 has been described thus far with reference to the device 28 of FIGS. 4-5. However, the device 28 only represents one exemplary embodiment within the broad scope of the invention. FIGS. 6-14 show additional exemplary configurations of a pressure differential device of the invention.

Figure 6:
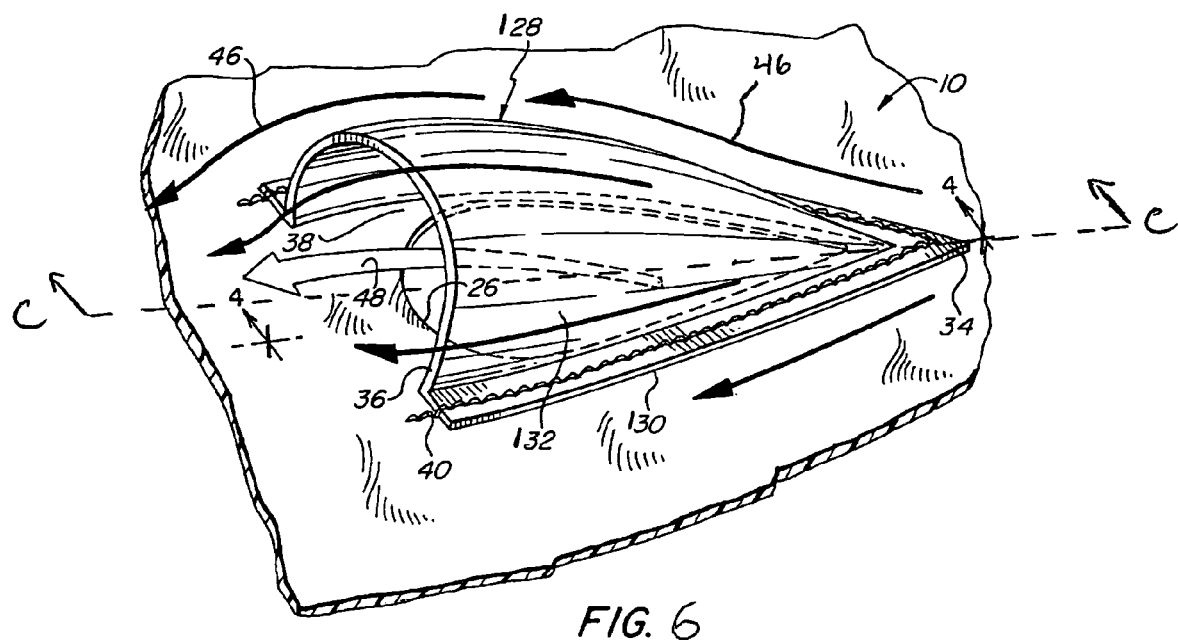
FIG. 6 is an enlarged partial view of the cover with a device thereon in another embodiment of the invention.

FIG. 6 shows a pressure differential device 128 according to the invention. Herein forward, elements which are consistent from one Figure to another will be indicated by consistent reference numerals and will not be specifically reintroduced. The device 128 is fixed on a portion of the cover 10, as will be discusser further herein, and is generally disposed over the exhaust aperture 26. The device 128 includes a base 130 affixed to the cover 10 and a body portion 132 extending from the base 130 and away from the cover 10. As discussed above with respect to the device 28, here the base 130 of the device 128 may be fixed to the cover by the thread 40 or other suitable means such as welding, adhesives, etc. The base portion 130 is generally V-shaped and the body portion 132 is generally curvilinear in shape and, more specifically, is partially conical in shape. The body portion 132 includes the closed end 34 and open end 36 discussed above. Here, the closed end 34 is located at the apex of the partial cone shaped body portion 132, the open end 36 is oppositely disposed.

Figure 7:
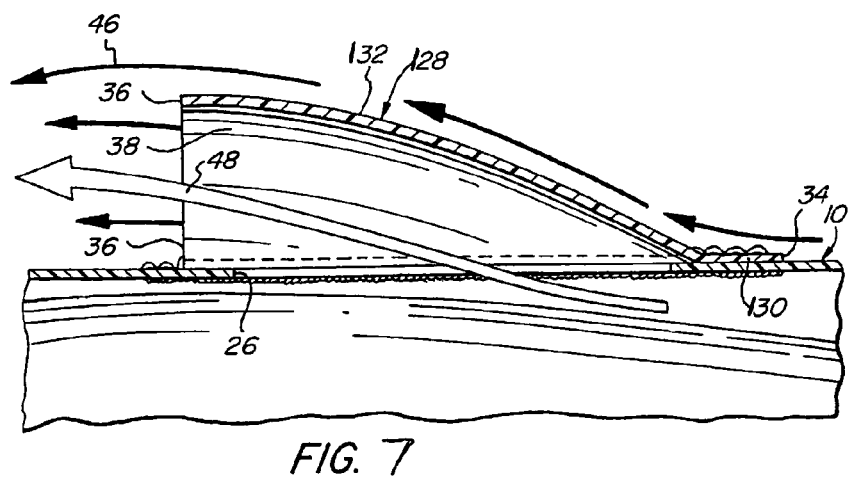
FIG. 7 is a cross-sectional view taken along the line C-C of FIG. 6.

Here again, as discussed above with reference to FIGS. 4-5, the device 128 creates, enhances, and maximizes a pressure differential between air under the cover 10 and air passing over or around the device 128, thus causing a suction which exhausts air from under the cover 10 through the aperture 26 which has the effect of drawing the cover tightly and securely against the cargo being transported. For example, when the device is subjected to an air stream 46 in a direction generally parallel to a longitudinal axis C-C of the device 128, as shown in FIGS. 6-7, an area of reduced air pressure is generated proximate the open end 36 of the body portion 132. This reduced pressure area draws air 48 from under the cover 10 out of the aperture 26 to an exterior of the cover 10. The exhausting air 48 creates a suction beneath the cover 10 which draws the cover toward the cargo and secures the cover firmly thereon.

In the above discussed example, the device 128 is fixed on the cover 10 so that the axis C-C of the device 128 is generally parallel to a direction of transport of the cargo and thus correspondingly generally parallel to the air stream 46. However, the device may be disposed in any orientation or disposition on the cover as desired. That is, the device creates and maximizes the pressure differential when disposed generally at any angle with respect to a direction of transport. For example, the device may be disposed perpendicular to the air stream, or at 30° thereto, or 45°, or 60°, etc., as desired for a particular application of the cover 10.

Figure 8:
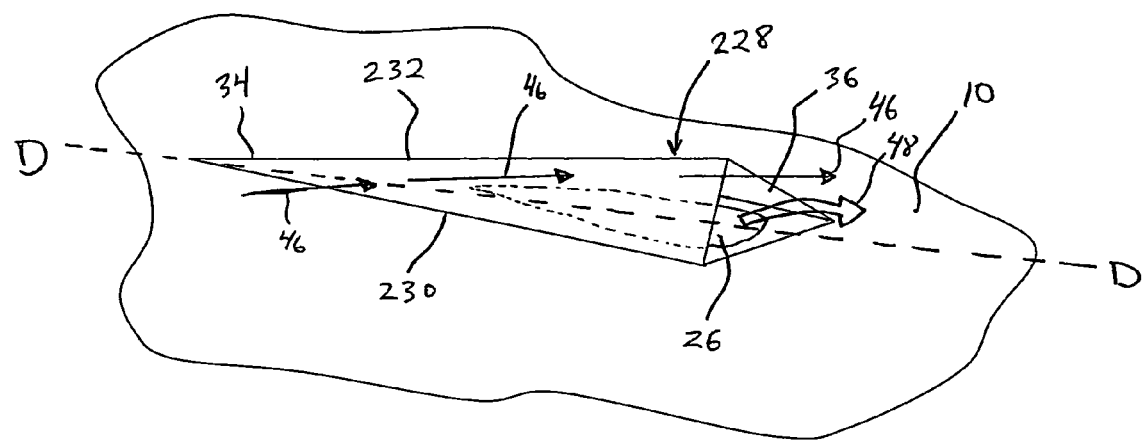
FIGS. 8-14 are additional enlarged partial views of the cover with a device thereon in other embodiments of the invention.

FIG. 8 shows a pressure differential device 228 in accordance with another embodiment of the invention affixed onto the cover 10. The device 228 comprises a body portion 232 having a base 230 which is sewn, welded, adhered, etc. onto the cover 10 such that the device 228 is generally disposed over the exhaust aperture 26. The body portion 232 has a generally elongated pyramidal shape with the oppositely disposed closed end 34 and open end 36.

The pressure differential device 228 functions to create, enhance, and maximize a pressure differential as similarly discussed above with reference to FIGS. 4-7. That is, when an air stream 46 passes over or around the body portion 232, an area of reduced pressure is generated proximate the open end 36 which draws higher pressure air 48 from under the cover 10 through the aperture 26 thus causing a suction which adheres the cover 10 to the cargo being transported. Of course, as discussed above concerning the previous embodiments, the device 228 may be positioned and oriented as desired on the cover 10 such that the air stream 46 approaches the device 228 from any angle with respect to a longitudinal axis D-D of the device.

Figure 9:
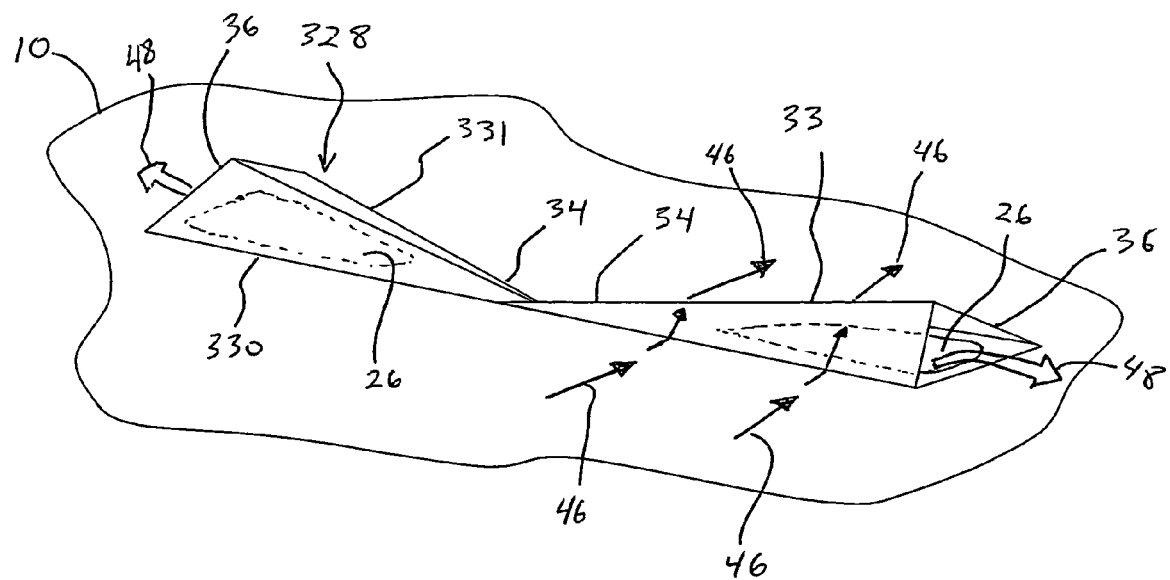

FIG. 9 shows a pressure differential device 328 in another embodiment of the invention. The device 328 includes an X-shaped base 330, fixed to the cover 10 as by means described above, and further includes a first body portion 331 and a second body portion 332 extending from the base 330 and way from the cover 10. The first and second body portions 331 and 332 comprise elongated pyramidal members which extend oppositely from one another over respective apertures 26. Each body portion 331, 332 includes the closed end 34 and the open end 36 discussed previously. The body portion 331, 332 meet at respective closed ends 34.

Here again, the air stream 46 which passes over the device 328 when the cover 10 is in movement creates, enhances, and maximizes a reduced pressure area proximate the open ends 36 of the body portions 331, 332 which draws higher pressure air 48 from under the cover 10 creating a suction and thus tightly securing the cover 10 on the cargo. The device 328 may be positioned at any orientation on the cover 10 such that the air stream 46 is incident upon the device 328 at any angle relative to a longitudinal axis of the device 328. That is, as with previously discussed embodiments, the device 328 effectively forms the pressure differential and the desired suction effect regardless of the angle of incidence of the air stream 46.

Figure 10:
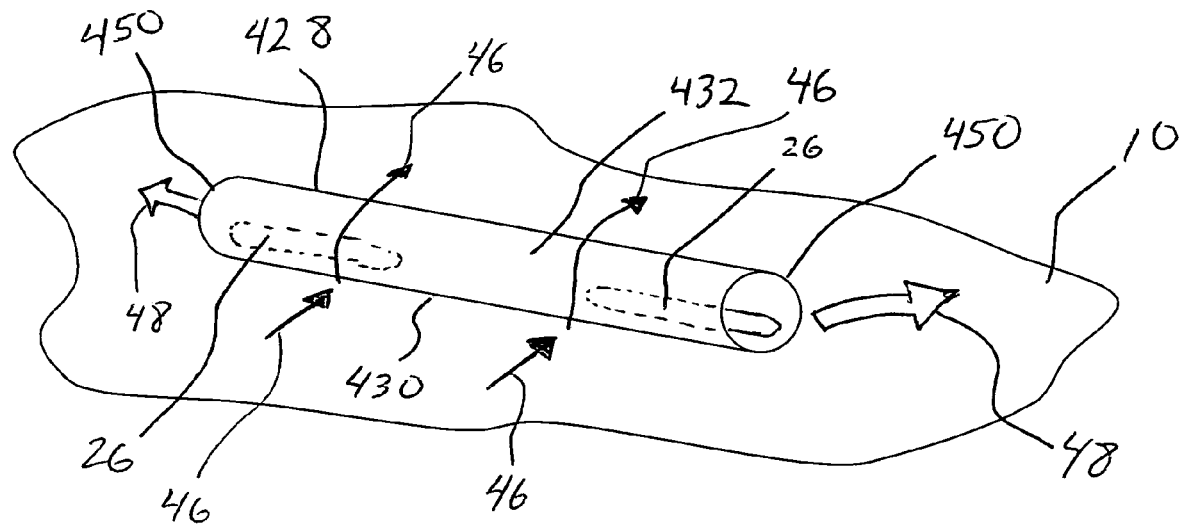

FIG. 10 shows a generally cylindrically shaped pressure differential device 428 in accordance with a further embodiment of the invention. The device 428 includes a base 430 affixed to the cover 10 atop the aperture 26 by fixation means discussed hereinabove. A body portion 432 of the device 428 extends from the base 430 and away from the cover 10. The body portion 432 is generally shaped as a hollow or partially-hollow cylinder. The body portion 432 is disposed atop the aperture 26 and includes an aperture which corresponds to the aperture 26 thus forming a pathway from under the cover 10 into the interior of the hollow/partially-hollow cylinder of the body portion 432. The device 428 further includes two opposite ends 450, at least one of which is open. In FIG. 10, both of the ends 450 are open. However, in another embodiment of the invention, the body portion 432 includes one open end 450 and one closed end 450. In the figure, two elongated apertures 26 are shown proximate to the open ends 450. In another embodiment, the device 428 includes a single aperture 26 or multiple apertures 26 along its length where the apertures 26 have any shape or elongation desired.

Figure 11:
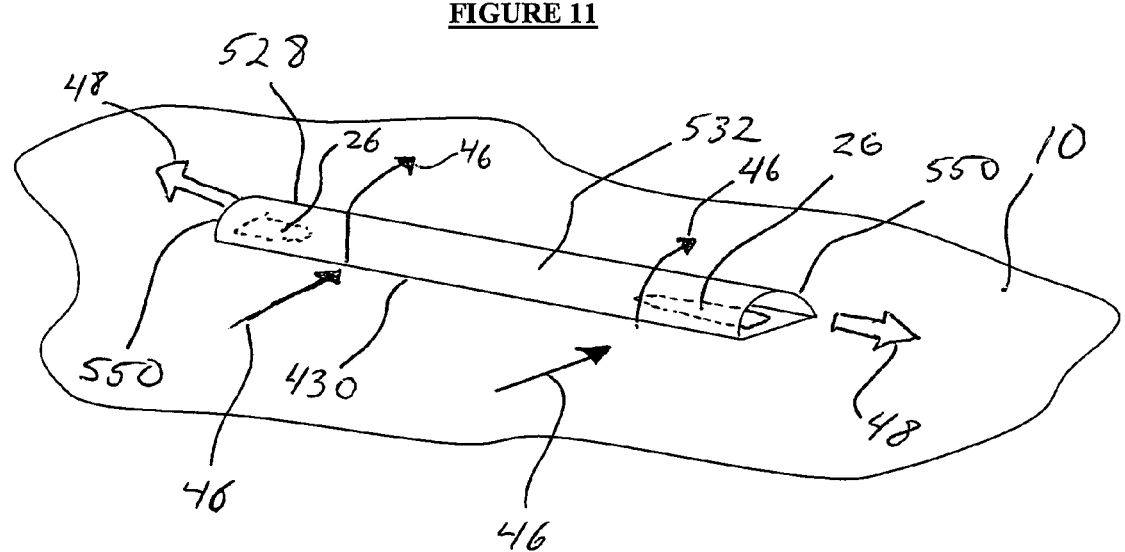

FIG. 11 shows a differential pressure device 528 in still another embodiment of the invention. The device 528 is, essentially, an elongated hemispherical member affixed to the cover 10, by means discussed herein, atop the aperture 26. The device 528 includes a base 530 attached to the cover 10 and a body portion 532 extending therefrom, the body portion 532 including opposite ends 550 which open to the exterior. Apertures 26 are disposed proximate to the open ends 550. In an alternate embodiment, the device 528 includes one closed end 550, one open end 550, and one aperture 26 disposed proximate to the open end 550. Also, the device 528 may include one or more apertures 26 extending partially or entirely beneath the length of the body portion 532 and having any shape and/or configuration as desired.

The devices 428 and 528 are described, respectively, as including generally cylindrical and hemispherical shapes. The invention contemplates additional and alternate shapes such as partially-cylindrical, partially hemispherical, etc.

The devices 428 and 528, as mentioned, are generally hollow or partially hollow elements. That is, one embodiment comprises the devices 428, 528 as essentially curvilinear tube-like elements. In another embodiment, the devices 428, 528 include a member, a solid or partially-solid section, etc. disposed within the respective body portion 432, 532. For example, the devices 428, 528 can include a solid or partially-solid middle portion.

The devices 428 and 528 function similar to previously discussed embodiments in creating a differential pressure which imposes a suction effect upon the cover 10. As shown in FIGS. 10 and 11, the air stream 46 passes over the respective body portions 432, 532 and forms an enhanced area of low pressure proximate to the open ends 450, 550 which causes the higher pressure air 48 to exhaust through the apertures 26 to the exterior, thus creating a suction which draws the cover 10 tightly against the cargo. As with previously discussed embodiments of the invention, the devices 428 and 528 effectively create the desired pressure differential when disposed at any angle relative to the angle of incidence of the air stream 46.

Figure 12:
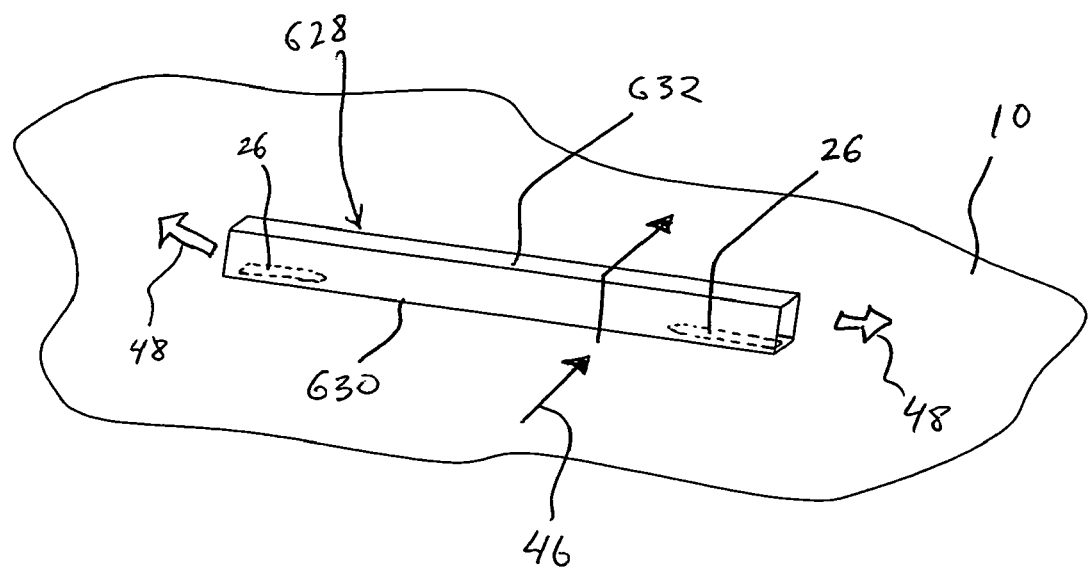
Figure 13:
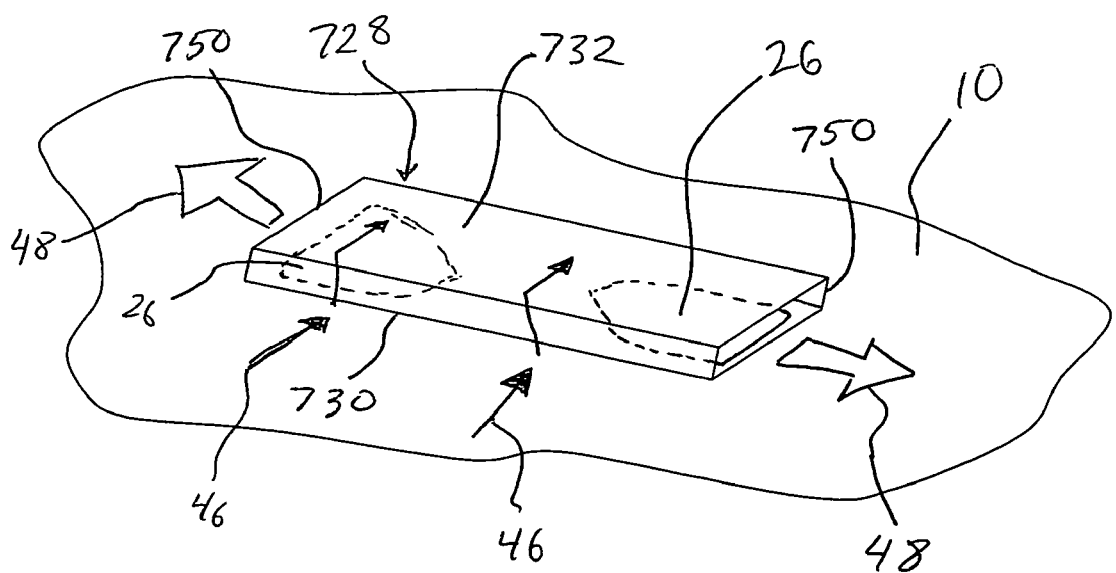

FIGS. 12 and 13 show further embodiments of rectilinear shaped pressure differential devices 628 and 728, respectively, in accordance with the invention. The device 628 is of a relatively narrow configuration whereas the device 728 has a wider, flatter shape as evident in the drawings. Both devices 628, 728 include respective bases 630, 730 affixed to the cover 10 and respective body portions 632, 732 extending therefrom. The body portions 632, 732 are positioned atop at least one aperture 26 which is disposed proximate an open end 650, 750 of the respective body portion 632, 732. One or both of the ends 650, 750 of the body portions 632, 732 may be open to the exterior of the device.

The devices 628 and 728 are hollow or partially-hollow rectilinear members. That is, one embodiment comprises the devices 628, 728 as essentially rectilinear tubes disposed atop one or more of the apertures 26. One or both of the oppositely disposed ends are open to the exterior. In another embodiment, the devices 628, 728 include a member or a solid or partially solid section, etc. disposed within the respective body portion 632, 732. For example, the devices 628, 728 can include a solid or partially-solid middle portion.

The devices 628 and 728 function similar to previously discussed embodiments in creating a differential pressure which imposes a suction effect upon the cover 10. As shown in FIGS. 12 and 13, the air stream 46 passes over the respective body portions 632, 732 and forms an enhanced area of low pressure proximate to the open end(s) 650, 750 which causes the higher pressure air 48 to exhaust through the aperture 26 to the exterior, thus creating a suction which draws the cover 10 tightly against the cargo. As with previously discussed embodiments of the invention, the devices 628 and 728 effectively create the desired pressure differential when disposed at any angle relative to the angle of incidence of the air stream 46.

Figure 14:
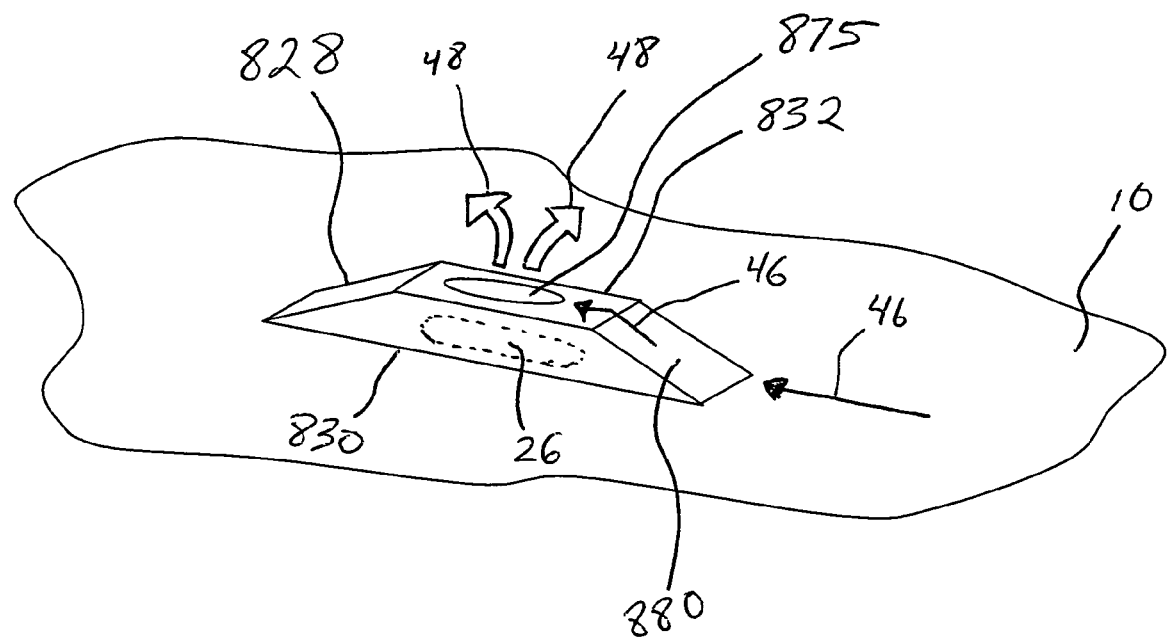

A further embodiment of a pressure differential mechanism according to the invention is shown in FIG. 14 and generally indicated at 828. The device 828 includes a base 830 affixed to the cover 10 as discussed herein and further includes a body portion 832 extending from the base 830 away from the cover 10. The device 828 is disposed on the cover 10 atop one or more of the apertures 26.

Thus far, the pressure differential devices of the invention described herein have been elongated members with one or more open ends fashioned over the apertures 26 such that air from under the cover 10 can exhaust through the aperture 26 and through the open end to an exterior of the device. The device 828 of the present embodiment, however, does not include such open end but instead includes an open top portion 875 disposed on an upper area of the body portion 832. The open top portion 875 is communicably engaged with the aperture 26 such that air 48 may exhaust from under the cover 10 through the aperture 26 and out the open top portion 875. That is, the body portion 832 is for example hollow, or partially-hollow, or includes a pathway, etc. such that the air from under the cover 10 has an exhaust passageway.

As shown in FIG. 14, the device 828 is rectilinear in shape and includes a plurality of sloped sides 880 to facilitate passage of the air stream 46 over the device 828. Two such sloped sides 880 are shown. The device 828 may include more or less sloped sides 880, as desired. Additionally, the rectilinear configuration of the device 880 is exemplary. The device 880 can alternatively include a curvilinear shape or a shape having both curvilinear and rectilinear features.

The open top portion 875 of the device 828 is shown in FIG. 14 as an oval opening formed at an upper area of the body portion 832. In another embodiment, this opening includes a rectilinear or combination rectilinear-curvilinear shape. The device 828 may further include a lip or rim or other feature disposed partially or wholly around or over the open top portion 875.

As alluded to above, the device 828 is configured to draw the air 48 from under the cover 10. Specifically, air 46 passing over or around the device 828 forms an area of reduced pressure proximate to the open top portion 875. In response to the lower pressure, air 48 from beneath the cover 10 having a higher pressure is drawn through the aperture 26, through the body portion 832, and out the open top portion 875 to the exterior of the device. The exhausting of the air creates a suction effect which draws the cover tightly against and around the cargo being transported. Notably, the device 828 results in the pressure differential when subjected to the air flow 46 at any angle of incidence relative to a longitudinal axis of the device 828.

As mentioned extensively throughout, the pressure differential device 28, 128, 228, 328, etc. of the invention effectively and efficiently creates, enhances, maximizes and maintains the desired difference in pressures regardless of the orientation or disposition of the device on the cover 10 relative to the direction of transport of the covered cargo. In other words, when subjected to an air stream at generally any angle relative to a longitudinal axis of the pressure differential device, the device effectively attains the desired pressure difference. This enables the device 28, 128, 228, etc. to be placed at any position and at any angle on the cover 10. In a preferred embodiment, the devices are disposed on the cover in areas of reduced turbulence.

Figure 15:
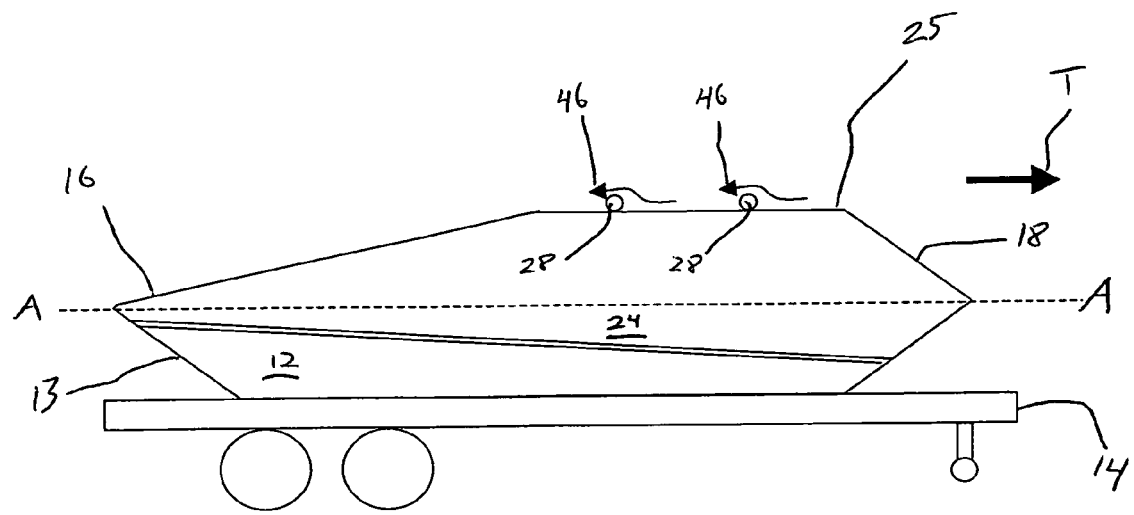
FIG. 15 is a side view of the cover secured about the watercraft where the watercraft is positioned on the trailer in an opposite direction.

The effectiveness of the device 28, 128, 228, etc. in creating the desired pressure differential and hence the resulting suction effect when the device is disposed at any location on the cover 10 and at any angle with respect to the direction of movement T enables broad advantageous usage of the cover 10. For example, referring again to FIGS. 1-3, the cover 10 secured to the water craft 12 may be towed on the trailer 14 in the direction of travel T as shown. With the watercraft oriented as such during travel, the air stream 46 passes over the device 28 as indicated forming a pressure drop at the open end(s) 36 of the device 28 causing the exhaust of air 48 from beneath the cover 10, thus suctioning the cover 10 to the watercraft 12. Similarly, the watercraft 12 may be oppositely disposed on the trailer 14 as shown in FIG. 15 such that the rear end 18 of the cover 10 faces the direction of travel T. In this configuration, the air stream 46 again passes over the 28 advantageously causing the pressure-differential-induced suction which adheres the cover 10 to the water craft 12. That is, the desired suction of the cover 10 to the watercraft 12 is obtained irrespective of the positioning of the watercraft 12 on the trailer 14 with respect to the direction of movement T.

Figure 16:
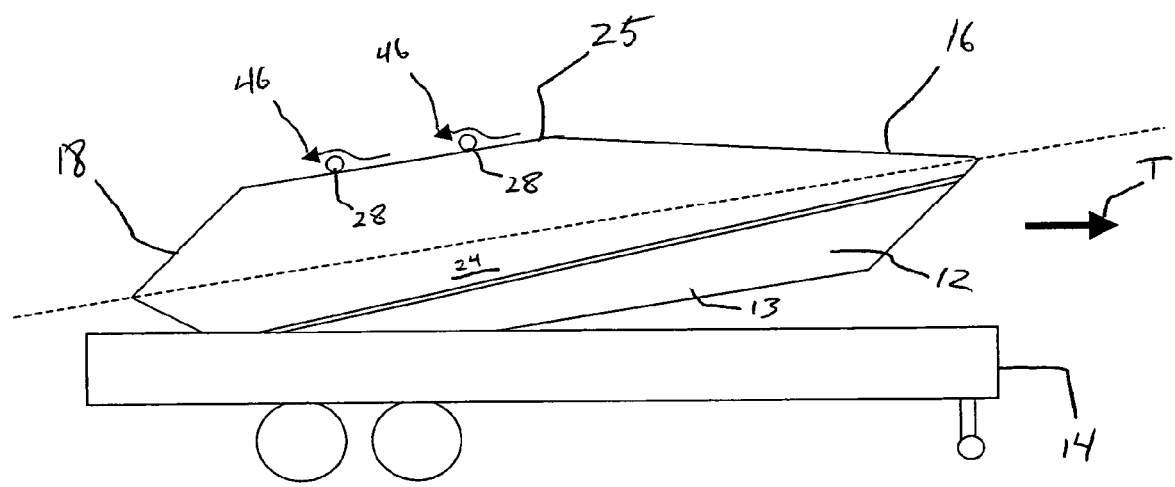
FIG. 16 is a side view of the cover secured on the watercraft with the watercraft pitched on the trailer.
Figure 17:
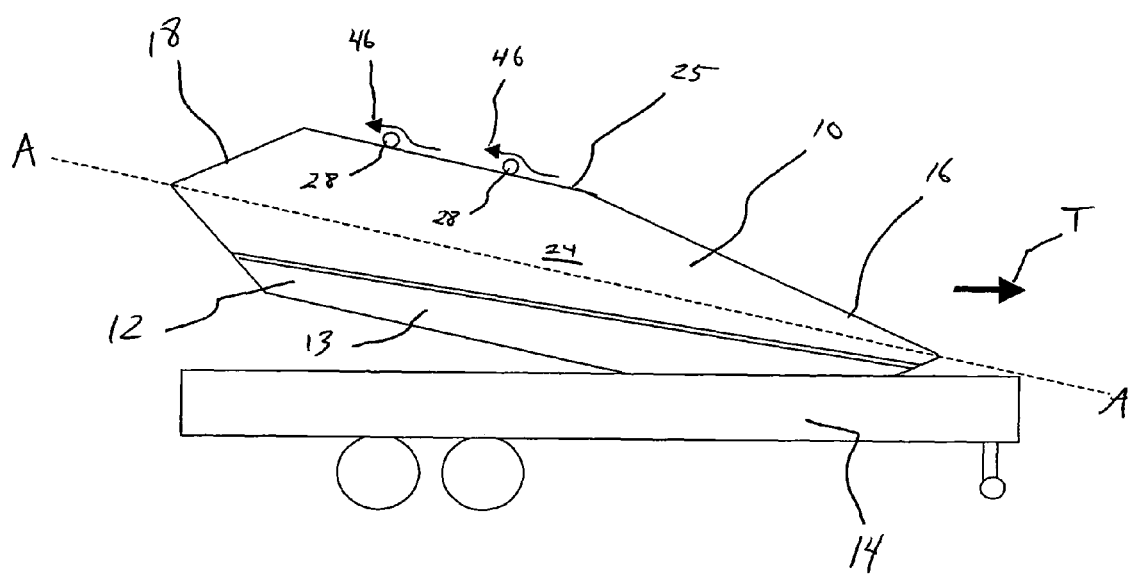
FIG. 17 is a side view of the cover secured on the watercraft with the watercraft pitched on the trailer.

The device 28 of the cover 10 is additionally effective when the watercraft 12 is at any desired pitch with respect to the direction of movement T. For example, as shown in FIGS. 16 and 17, the watercraft 12 may be positioned on the trailer 14 pitched or angled with respect to the direction of travel T. That is, the watercraft 12 is placed on the trailer 14 such that the longitudinal axis A-A of the watercraft 12 is at an angle to the direction of movement T. FIG. 16 shows the watercraft 12 pitched rearward with the rear end 18 lower than the front end 16 and FIG. 17 shows the watercraft 12 pitched forward with the front end 16 lower than the rear end 18. In these configurations, and any other angled or pitched positioning of the watercraft 12, the air stream 46 again passes over the device 28, 128, 228, etc. as described above, to create the pressure differential and the resulting suction of the cover 10 to the pitched/angled watercraft 12.

The ability to dispose the pressure differential device 28 and corresponding aperture 26 in virtually any position on the cover 10 and in any orientation with respect to the direction of travel T such that the device 28 remains effective at creating the pressure-differential-induced suction of the cover 10 to the watercraft 12 when the watercraft 12 is in transit in any direction and/or pitch, is not found in the prior art, is a marked improvement thereover, and results in an advantageous protective cover generally suitable for wide applications in the art of cargo transit.

Figure 18:
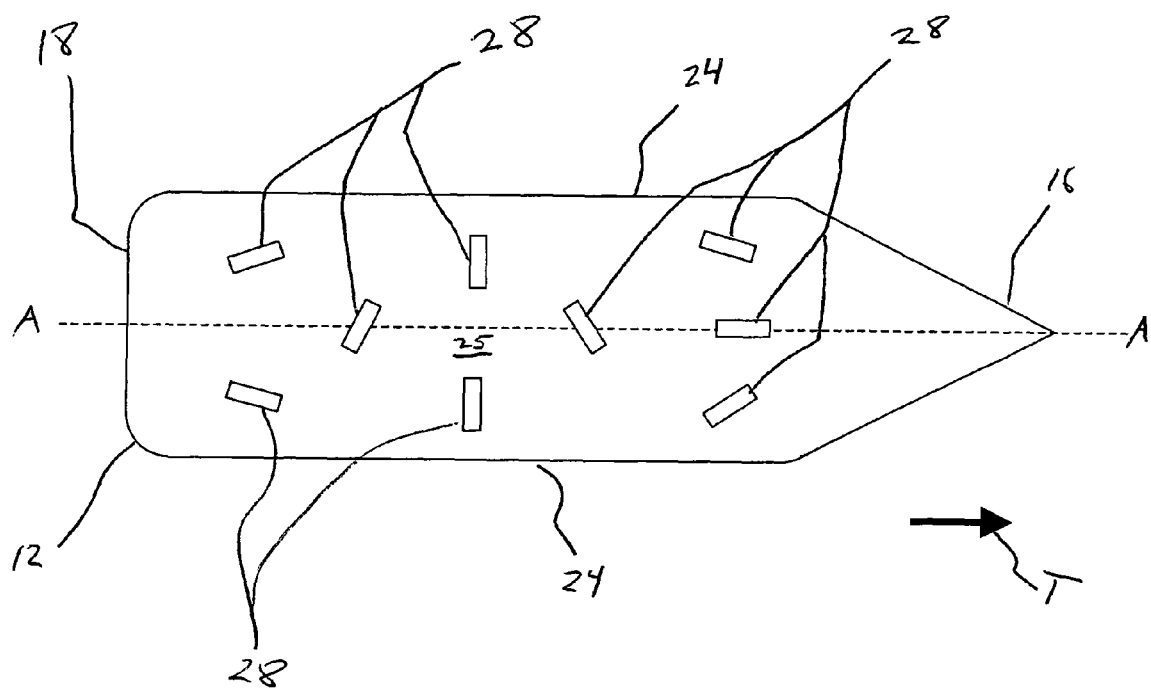
FIG. 18 is a top view of a cover of the invention secured to the watercraft, the cover including various devices fixed thereon.

As discussed with reference to FIGS. 1-3 and 15-17, in one embodiment of the invention, the pressure differential device 28, 128, 228, etc. is disposed along the longitudinal axis A-A of the watercraft 12. (See particularly FIG. 3.) However, this disposition of the device is merely exemplary. The device may alternatively be disposed at an position on the cover 10. FIG. 18 is a schematic elevation view of the watercraft 12 which represents potential exemplary dispositions of the pressure differential device on the cover 10 of the invention. As shown, the device may be positioned along the watercraft axis A-A and at any angle thereto. Alternatively and/or additionally, the device 28, 128, 228, etc. can be disposed proximate to the top 25, the sides 24, the front 16, and/or the rear 18 of the cover 10 as desired. Further, the pressure differential device may be disposed at any desired angle with respect to the watercraft axis A-A. FIG. 18 simply shows exemplary potential placements of the pressure differential device and by no means limits the possible dispositions and orientations of the device(s) upon the cover. The cover 10 may include a single pressure differential device or a plurality of such devices.

As will be appreciated, various materials may be employed for the construction of the cover. Most conveniently, the cover is made of an air impermeable material which is flexible over a wide temperature range to accommodate for the various operating environments in which the cover may be used. Exemplary materials include synthetic resins such as 600 denier polyester or 1200 denier polypropylene, with a polyurethane resin coating. Particularly, the cover may comprise a non-woven polypropylene laminated to a polyethylene sheeting. Another material which may be used is nylon or polyester film on a non-woven synthetic scrim.

Similarly, various materials may be employed for the construction of the device 28. Desirably, the device 28 will be lightweight and exhibit resiliency over a broad temperature range. Conveniently, the device 28 is molded from of a synthetic resin such as polypropylene or other similar material.

As will be further appreciated, the device 28 may be attached to the cover 10 by suitable means including sewing by thread 40, adhesives, heat sealing, and fasteners such as rivets and staples.

It will be appreciated that the operation of the present invention is most effective with covers which conform reasonably closely to the contours of the cargo about which they are placed, but this is not essential. It is necessary that the bottom of the cover fit closely about the periphery of the cargo to minimize air flow thereunder into the interior of the cover. Thus, covers with bottom portions which can be drawn tightly about the cargo are desirable and this can be provided by elasticized edge portions, draw strings, hook and loop fasteners, etc.

In addition, although not normally necessary, it may be desirable to secure the cover on the cargo by tie downs such as straps which can extend about the bottom of the cargo so that the cover is secured about the cargo while it is being lifted or moved.

Thus, it can be seen from the foregoing detailed description and accompanying drawings that the novel protective cover of the present invention is one which effectively fits relatively closely about articles being transported and effectively prevents whipping and buffeting of the cover at transport speeds by use of a unique pressure differential device positionable on the cover in virtually any location thereon and in any orientation with respect to the direction of transport which creates a pressure-differential-induced suction of the cover to the cargo when the cargo is transported in any direction and/or pitch with respect to the direction of movement. The cover may be readily and economically fabricated for a large variety of cargos such as boats and other personal watercraft, snowmobiles, automobiles, bicycles, motorcycles, and/or other items in tow or otherwise externally exposed during transit.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A device for covering an object to be transported in an air stream generated by forward or backward movement of the object, the device comprising:
    a cover which at least partially traverses the object; and
    a differential pressure device disposed on the cover which creates a pressure differential between air under the cover and air passing over or around the cover;
    wherein the pressure differential causes the air under the cover to exhaust to an exterior of the cover, drawing the cover toward the object; and
    wherein the pressure differential device creates the pressure differential when the direction of transport is at least one of forward or backwards;
    wherein the pressure differential device comprises a body member and wherein the cover comprises at least one aperture formed therethrough, the body member delimiting at least one pathway from the at least one aperture to the exterior of the cover;
    wherein the differential pressure device further comprises a base affixed to the cover proximate to the at least one aperture such that the body member extends at least partially over the aperture;
    wherein the pressure differential device further comprises at least one open end, the at least one pathway extending from the aperture to the at least one open end, wherein the at least one pathway is positioned substantially perpendicular to a direction of the air stream and the direction of transport, the at least one pathway being configured and positioned on the cover to remain substantially perpendicular to the direction of the air stream and the direction of transport when the object is vertically tilted 0 to 15 degrees upwards or 0 to 15 degrees downwards.

2. A device for covering an object which is transported in an air stream, comprising:
- a cover which at least partially traverses the object; and
- a differential pressure device disposed on the cover which creates a pressure differential between air under the cover and air passing over or around the cover;
- wherein the pressure differential causes the air under the cover to exhaust to an exterior of the cover, drawing the cover toward the object; and
- wherein the pressure differential device creates the pressure differential when the covered object is transported in a frontward position with respect to a direction of transport and in a rearward position with respect to the direction of transport;
- wherein the pressure differential device comprises a body member and wherein the cover comprises at least one aperture formed therethrough, the body member delimiting a first and a second pathway from the at least one aperture to the exterior of the cover;
- wherein the at least one aperture comprises a first aperture and a second aperture, the body member comprising a first portion extending at least partially over the first aperture to delimit the first pathway, the body member further comprising a second portion extending at least partially over the second aperture to delimit the second pathway;
- wherein the body member further comprises a closed middle portion, and wherein each of the first and second portions include a closed end and an open end, the closed ends being disposed at the closed middle portion, the open ends extending in opposite directions from the closed middle portion.

3. The device of claim 2, wherein the open ends of the first and second portions face a direction substantially perpendicular to the direction of transport.

4. A device for covering an object which is transported in an air stream, comprising:
- a cover which at least partially traverses the object; and
- a differential pressure device disposed on the cover which creates a pressure differential between air under the cover and air passing over or around the cover;
- wherein the pressure differential causes the air under the cover to exhaust to an exterior of the cover, drawing the cover toward the object; and
- wherein the pressure differential device creates the pressure differential when the covered object is transported in a frontward position with respect to a direction of transport and in a rearward position with respect to the direction of transport;
- wherein the pressure differential device comprises a body member and wherein the cover comprises at least one aperture formed therethrough, the body member delimiting a first and a second pathway from the at least one aperture to the exterior of the cover;
- wherein the body member comprises two substantially partially conical members adjoined at respective closed apex ends and extending oppositely therefrom, over the aperture, to respective open ends, the conical members including rectilinear and/or curvilinear features.

5. The device of claim 1, wherein the device includes a first pathway and second pathway, the first and second pathways opening in substantially opposite directions.

6. The device of claim 1, wherein the at least one pathway is positioned in a plane running substantially parallel to a surface upon which the object is transported.

7. A method for creating pressure differential between a space under a cover of a transportable object and a space around the cover of the object, the method comprising:
- forming at least one aperture in the cover;
- disposing a pressure differential device on the cover, the pressure differential device delimiting at least one pathway from the at least one aperture to the exterior of the cover;
- transporting the object in at least one of a forward and backward direction;
- exhausting air from the space under the cover via the transporting of the object, the exhausting of the air at least partially occurring within the at least one pathway in a direction substantially perpendicular to a direction of the transporting;
- causing the cover to seat snugly about a surface of the object via the exhausting; and
- positioning the pressure differential device on the cover such that the at least one pathway is substantially perpendicular to a direction of the transporting, and remains substantially perpendicular to a direction of the transporting when the object is vertically tilted 0 to 15 degrees upwards or 0 to 15 degrees downwards.

8. The method of claim 7, further including positioning the at least one pathway in a plane running substantially parallel to a surface upon which the object is transported.

* * * * *